United States Patent [19]

Kitamura

[11] Patent Number: 5,438,196
[45] Date of Patent: Aug. 1, 1995

[54] SCANNING TUNNELING MICROSCOPE

[75] Inventor: Shinichi Kitamura, Saitama, Japan

[73] Assignee: Jeol Ltd., Tokyo, Japan

[21] Appl. No.: 163,339

[22] Filed: Dec. 6, 1993

[30] Foreign Application Priority Data

Dec. 4, 1992 [JP] Japan ................... 4-325212

[51] Int. Cl.⁶ ........................... H01J 37/252
[52] U.S. Cl. ................... 250/306
[58] Field of Search ............... 250/306, 307, 310, 305, 250/442.2 R

[56] References Cited

U.S. PATENT DOCUMENTS

| | | | |
|---|---|---|---|
| 4,698,502 | 10/1987 | Bednorz et al. | 250/306 |
| 4,954,711 | 9/1990 | Fink et al. | 250/310 |
| 5,081,353 | 1/1992 | Yamada et al. | 250/306 |
| 5,099,117 | 3/1992 | Frohn et al. | 250/306 |
| 5,122,663 | 6/1992 | Chang et al. | 250/310 |
| 5,231,287 | 7/1993 | Sekine et al. | 250/305 |

OTHER PUBLICATIONS

"A scanning tunneling microscope controlled field emission microprobe system", T. H. P. Chang, D. P. Kern, M. A. McCord and L. P. Muray, *J. Vac. Sci Technol. B 9(2)*, Mar./Apr. 1991, pp. 438–443.

*Primary Examiner*—Paul M. Dzierzynski
*Assistant Examiner*—Kiet T. Nguyen
*Attorney, Agent, or Firm*—Webb Ziesenheim Bruening Logsdon Orkin & Hanson

[57] ABSTRACT

A scanning tunneling microscope having a scanner driven in three dimensions. A conducting tip is attached to the front end of the scanner. A voltage is applied between the tip and a specimen. Movement of the tip is controlled so that the resulting tunneling current is maintained constant. A scanning tunneling microscope (STM) image is created from a control signal for controlling the movement of the tip. The microscope is equipped with a secondary electron detector for detecting secondary electrons emitted from the specimen when the voltage applied between the tip and the specimen is increased. A secondary electron image originating from the same field of view as the STM image is derived.

4 Claims, 2 Drawing Sheets

SCANNING TUNNELING MICROSCOPE

FIELD OF THE INVENTION

The present invention relates to a scanning tunneling microscope capable of observation of secondary electron images.

BACKGROUND OF THE INVENTION

Conventionally, a scanning electron microscope is sometimes attached to a scanning tunneling microscope (STM). Secondary electrons are detected by the scanning electron microscope (SEM). The specimen surface is searched for a region of interest. This region is scanned by the STM, thus obtaining an STM image. It is also common practice to scan the conducting tip of the STM with an electron beam and to display an SEM image. This enables the operator to confirm and evaluate the shape of the tip.

An STM creates a topographic image of a specimen surface. On the other hand, in a SEM, the secondary electron emission rate differs according to the tilt of the specimen surface. An image representing the topography of the specimen surface is obtained, utilizing this difference in the secondary electron emission rate. Also, an image representing the atomic composition of the specimen surface is derived by making use of the fact that the secondary electron emission rate differs according to the composition of the specimen. In this way, the STM image and the SEM image offer different kinds of information. Therefore, one sometimes wants to compare these two kinds of images. In some cases, one wants to find a point of interest while observing an STM image and to produce Auger electrons from this point for analyzing it. In order to make such a comparison, it is necessary that they lie in the same field of view. It is not easy for the conventional STM equipped with an SEM to bring the fields of view of both images into agreement. Furthermore, a gross difference in resolution between these two kinds of microscopes makes it difficult to compare both images.

Additionally, the conventional instrument needs separate devices (e.g., an electron gun, electromagnetic lenses, deflectors and a scanning power supply) to obtain secondary electron images. Therefore, if observation of secondary electron images is made possible, then the cost of fabricating the whole instrument is inevitably increased.

Moreover, it is necessary for the prior art instrument to illuminate the specimen with an electron probe having a sufficient amount of electrical current on the order of 0.1 to 1 nA in order to obtain Auger images. As a result, the diameter of the electron probe amounts to approximately 500 Angstroms. This makes it impossible to have a high-resolution Auger image. Where it is attempted to analyze a certain point in an STM image by Auger spectroscopy, it has been impossible to analyze the energies of Auger electrons by directing an electron beam to a point on the specimen which corresponds to the certain point.

SUMMARY OF THE INVENTION

It is an object of the present invention to provide an STM which is free of the foregoing problems and capable of easily creating both an STM image and a scanning secondary electron image from the same field of view.

It is another object of the invention to provide an inexpensive STM which is simple in structure and capable of providing both an STM image and a scanning secondary electron image.

It is a further object of the invention to provide an STM capable of producing Auger electron images at high resolution.

It is yet another object of the invention to provide an STM capable of conducting Auger spectroscopy by emitting Auger electrons from a point on a specimen which corresponds to a certain point in an STM image.

Briefly, according to this invention, there is provided an STM comprising: a conducting tip; a means for moving the tip relative to a specimen in two dimensions; a variable bias voltage source for applying a negative or positive potential to the tip with respect to the specimen; a device for varying a distance between the tip and the specimen so that a tunneling current flowing therebetween is kept constant; a control means for controlling operation of the device; a secondary electron detector for detecting secondary electrons emitted from the specimen when the absolute value of the negative potential applied to the tip from the bias voltage source is increased; and a means for displaying an output signal from the secondary electron detector in relation to a scanning position of the tip, thereby displaying a secondary electron image of the specimen.

When the absolute value of the negative potential applied to the tip is increased compared with the value applied when a normal STM image is obtained, secondary electrons are emitted from the specimen. The distance between the tip and the specimen is controlled by a z-axis piezoelectric drive in such a way that the tunneling current is maintained constant. At the same time, the specimen is scanned by the tip in two dimensions. Thus, an STM image is displayed according to a signal for controlling the z-axis drive. The secondary electrons are detected by the secondary electron detector. The output signal from the detector is supplied to a display device. Consequently, a secondary electron image originating from the same field of view as the STM image can be displayed.

BRIEF DESCRIPTION OF THE DRAWINGS

Further features and other objects and advantages will become clear from the following detailed description made with reference to the drawings, in which.

DETAILED DESCRIPTION OF THE INVENTION

Figure 1:
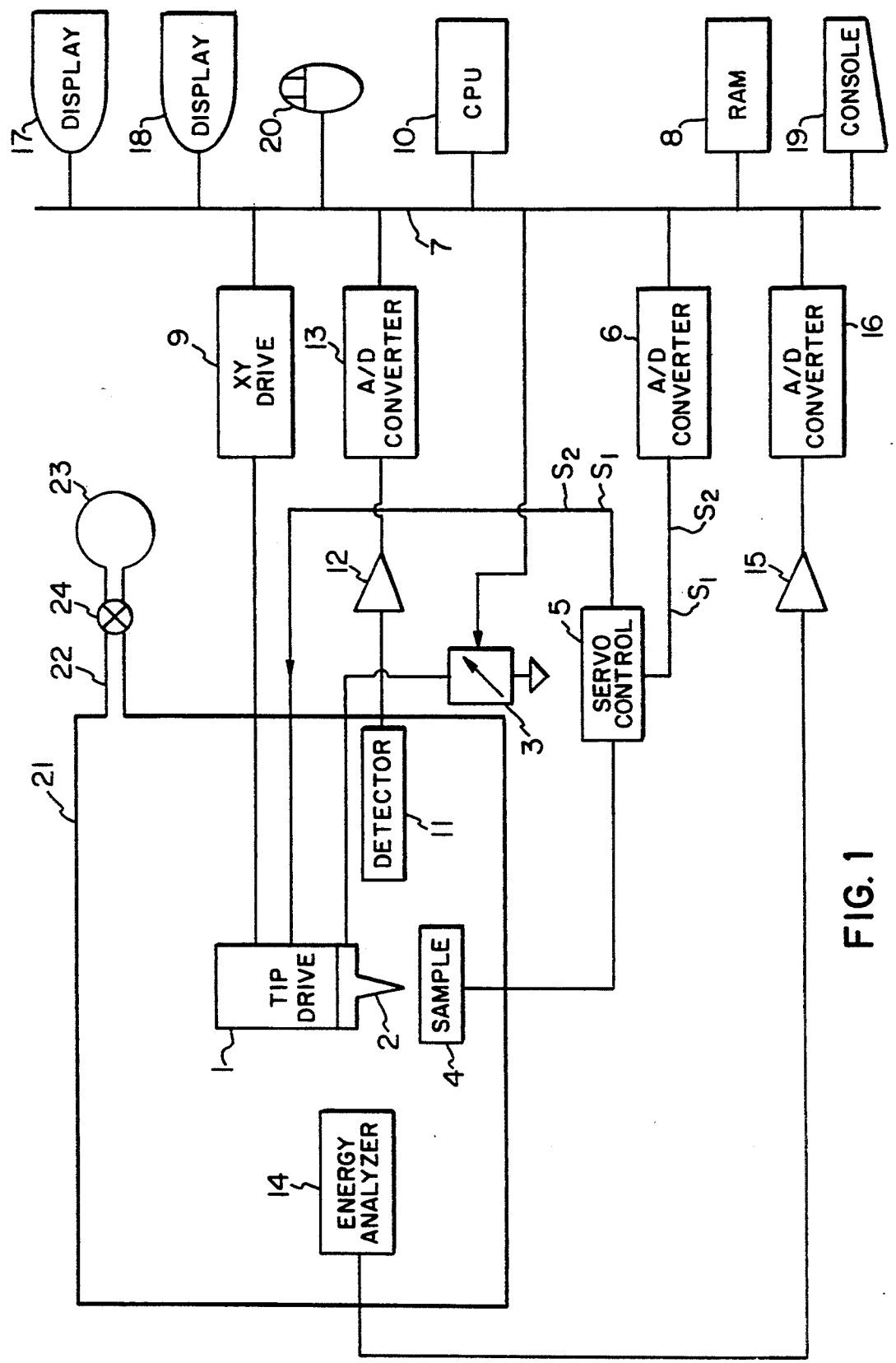
FIG. 1 is a block diagram of an STM according to the present invention.

Referring to FIG. 1, there is shown an STM embodying the concept of the present invention. This microscope comprises a three-dimensional tip drive unit 1 having a conducting tip 2 attached to the front end of the unit 1. Often, the drive comprises a three-layer piezoelectric unit. A variable bias voltage source 3 applies a bias voltage between the tip 2 and a specimen 4. A servo (feedback control) circuit 5 detects the tunneling current flowing between the tip 2 and the specimen 4 and produces a control signal for controlling the z drive of the drive unit 1 (controlling the distance between the tip and specimen) so that the tunneling current is maintained at a predetermined constant value. The control signal for controlling the z drive represents the topography of the specimen surface and is sent to a memory 8 via an analog-to digital (A/D) converter 6. An address and data bus is indicated by numeral 7. A CPU 10 causes an XY drive signal generator 9 to produce a signal for driving the tip 2 along the X-Y plane which is generally parallel to the specimen surface. The output signal from a secondary electron detector 11 is sent to the memory 8 via both an amplifier 12 and an A/D converter 13. An energy analyzer 14 analyzes the energies of Auger electrons emitted from the specimen 4. The output signal from the analyzer 14 is fed to the memory 8 via both an amplifier 15 and an A/D converter 16. The microscope is further equipped with display devices 17 and 18 and a console 19. A pointing device 20 (for example, a computer "mouse") permits the operator to specify an arbitrary point on the viewing screen of either the display device 17 or 18. The inside of a chamber 21 is evacuated by vacuum pumps (not shown). The aforementioned tip 2, specimen 4, secondary electron detector 11, energy analyzer 14, and other components are housed in the chamber 21 which is connected with an argon gas bomb 23 via a pipe 22. A valve 24 is mounted inside the pipe 22.

Aquisition of Normal STM Image

In this structure, when a normal STM image is observed, the console 19 is operated so as to instruct the instrument to display a normal image. Then, the variable bias voltage source 3 applies a negative or positive potential of several volts to the tip 2 with respect to the specimen 4. The servo circuit 5 sets up the system so that the tunneling current is maintained at about 1 nA. The CPU 10 causes the XY drive signal generator 9 to produce an XY scanning signal which is sent to the XY drive portion of the three-dimensional probe drive unit 1. In consequence, the specimen 4 is scanned by the tip 2 in two dimensions. A z-axis control signal $S_1$ produced in response to the scan is sent to the memory 8, where the signal is stored. The signal is read from the memory and displayed, whereby an STM image of the specimen 4 is obtained.

Acquisition of Secondary Electron Image

An operation for obtaining a secondary electron image from a region which gave rise to the STM image in response to the first scan is now described. First, the variable bias voltage source 3 is operated to apply a negative potential of 30 V to the specimen 4 from the bias voltage source 3. The servo circuit 5 sets up the system so that the tunneling current is maintained at a constant value of approximately 0.1 to 1 $\mu$A. Then, the CPU 10 orders the XY drive signal generator 9 to generate an XY scanning signal. In response to this scanning signal, the specimen 4 is scanned by the tip 2. Where the absolute value of the negative potential impressed on the tip 2 is thus made larger than the absolute value of the potential applied when a normal STM image is created, the specimen 4 produces secondary electrons when electrons tunnel from the tip 2 to the specimen 4. The produced secondary electrons are detected by the secondary electron detector 11. The output signal from the detector 11 is written to the memory 8. Also, a z-axis control signal $S_2$ obtained in response to the scan is sent to the memory 8, where the signal is stored.

Figure 2:
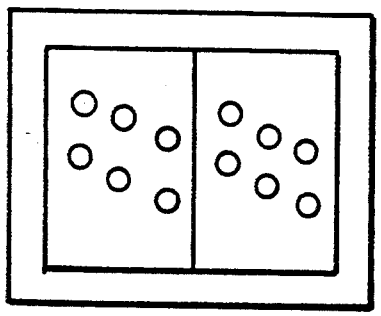
FIG. 2 is a diagram illustrating an STM image and a secondary electron image with the same field of view displayed in a side-by-side relation on the microscope shown in FIG. 1.

If the console 19 is so operated that both an STM image and a secondary electron image arising from the same field of view are displayed, then image signals about these two images stored in the memory 8 are sent to the display device 17. As a result, images as shown in FIG. 2 are presented on the viewing screen of the display device 17. In FIG. 2, the left frame shows the STM image, while the right frame shows the secondary electron image. These two images within the same field of view can be compared easily by observing them displayed in this manner. In this case, if an STM image is created from the z-axis control signal $S_1$ obtained by the first scan (when tunneling current is maintained at about 1 nA), then a high-resolution STM image can be displayed. Although this STM image is derived from the same field of view as the scanning secondary electron image, they are not obtained simultaneously. If an STM image obtained simultaneously with a scanning secondary electron image should be displayed, the z-axis control signal $S_2$ is read from the memory 8 and presented on the display device 17. The STM image arising from the signal $S_2$ (when tunneling current is maintained at approximately 0.1 to 1 $\mu$A) is slightly inferior in resolution to the image originating from the signal $S_1$ but has been obtained in response to the same scan as made to obtain the secondary electron image.

Scanning Auger Analysis

A two-dimensional image is obtained in response to detection of Auger electrons having a certain energy in the manner described now. First, the variable bias voltage source 3 is operated to apply a negative potential of hundreds of volts to the tip 2 with respect to the specimen 4. In the same way as in the above-described case, the servo circuit 5 sets up the system in such a way that the tunneling current is maintained at a constant value of about 0.1 to 1 $\mu$A. When the specimen 4 is scanned by the tip 2 in two dimensions, Auger electrons are emitted from the specimen 4 while electrons are tunneling from the tip 2 to the specimen 4. Therefore, if the pass energy of the energy analyzer 14 is so set that only Auger electrons having a given energy are detected by the energy analyzer 14, then an image indicative of the Auger electrons having the given energy can be created from the output signal from the energy analyzer 14 and displayed on the display device 18.

Figure 3A:
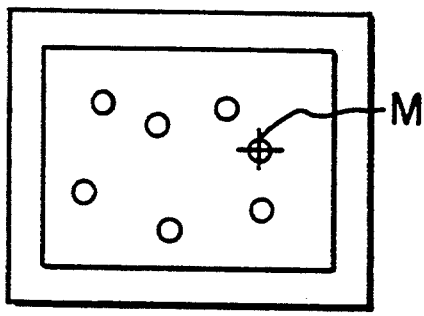
FIG. 3(a) is a diagram illustrating an STM image containing a point specified by a pointing device included in the microscope shown in FIG. 1.

When an STM image is being displayed as shown in FIG. 3(a), a point of interest within the image is designated, and then the energy spectrum of Auger electrons emitted from this point is obtained in the manner described now. The pointing device 20 is operated while monitoring the STM image as shown in FIG. 3(a). A mark M is moved into the point of interest within the STM image.

Fixed Point Auger Analysis

At the same time, the CPU 10 causes the XY drive signal generator 9 to produce an XY drive signal. This moves the tip 2 to the point on the specimen designated by the mark M. The potential applied to the tip 2 by the variable bias voltage source 3 and the tunneling current maintained by the servo circuit 5 are set equal to the potential and the tunneling current, respectively, used when the aforementioned Auger spectrum is derived.

Figure 3B:
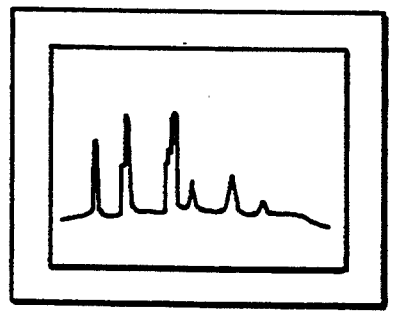
FIG. 3(b) is a diagram illustrating an Auger spectrum corresponding to the point specified as shown in FIG. 3(a).

As a result, Auger electrons are emitted from the specimen 4. The energy analyzer 14 is energy swept. During this sweep, Auger electrons are detected. The output signal from the analyzer 14 is fed to the display device 18. As a result, an Auger spectrum as shown in FIG. 3(b) is displayed.

Field Ionization

A secondary electron image of the specimen 4 is obtained by utilizing field ionization in the manner described below. The valve 24 is opened to introduce argon gas from the argon gas bomb 23 into the chamber 21. The variable bias voltage source 3 is operated to apply a positive potential of 30 V to the tip 2 with respect to the specimen 4. The servo circuit 5 sets up the system in such a way that the tunneling current is maintained at a constant current of 0.1 to 1 μA. The tip 2 is scanned over the specimen 4 in two dimensions by the three-dimensional tip drive unit 1. Thus, electrons tunnel from the specimen 4 to the tip 2. The servo circuit 5 controls the elongation and contraction of the z-drive of the three-dimensional tip drive unit 1 so that the resulting tunneling current may be maintained at the above-described constant value. Also in this case, the tip 2 scans the topographically rough surface of the specimen 4 while maintaining constant the gap between the specimen surface and the tip 2. At this time, a strong electric field is set up around the tip 2. Therefore, argon gas atoms traveling and successively coming close to the tip 2 are ionized by the field and become positive ions. The positive ions are moved towards the specimen 4 by the field and collide against the specimen 4, producing secondary electrons. The produced secondary electrons are detected by the detector 11. Since the secondary electrons are induced during the movement of the tip 2, a secondary electron image can be obtained also in this case.

It is to be noted that the foregoing embodiment merely constitutes a part of the present invention and that various changes and modifications are possible. In the above embodiment, tunneling electrons are emitted from the tip 2 to the specimen 4, producing secondary electrons from the specimen 4. A negative potential of 30 V is applied to the tip 2 with respect to the specimen 4 in order to detect the secondary electrons emitted from the specimen 4. If the applied voltage is about $-15$ V, a scanning secondary electron image can be observed. Furthermore, the invention can be implemented if a potential of $-100$ to $-150$ V is applied.

Also in the above embodiment, the energies of Auger electrons are analyzed by the energy analyzer. The energies of secondary electrons or other kinds of electrons may also be analyzed.

As described thus far in the present invention, a scanning secondary electron image derived from the same field of view as an STM image can be easily observed. Since the scanning secondary electron image observed in the present invention has the same magnification as the STM image, a scanning secondary electron image with high magnification and high resolution can be observed. In addition, a separate electron gun, electromagnetic lenses, deflectors and scanning power supply are not needed to observe a scanning secondary electron image. Hence, the cost of fabricating the instrument can be minimized.

Further, in the present invention, Auger electrons are generated according to a sufficient amount of electrons tunneling between the tip and the specimen. Since the diameter of the tunneling current flux is small, the resolution of the Auger electron image can be improved.

Having thus described my invention with the detail and particularity required by the Patent Laws, what is claimed to be protected by Letters Patent is set forth in the following claims.

What is claimed is:

1. A scanning tunneling microscope comprising:
   a conducting tip;
   a means for moving said tip relative to a specimen in two dimensions;
   a variable bias voltage source for applying a negative potential to said tip with respect to said specimen;
   a device for varying a distance between said tip and said specimen so that a tunneling current flowing therebetween is kept constant;
   a control means for controlling operation of said device;
   a secondary electron detector for detecting secondary electrons emitted from said specimen when absolute value of said negative potential applied to said tip from said bias voltage source is increased; and
   a means for displaying a scanning tunneling microscope image and for displaying a scanning secondary electron image based upon an output signal from said secondary electron detector in relation to a scanning position of said tip, whereby the scanning tunneling microscope image and the scanning secondary electron image having the same field of view and magnification are displayed.

2. The scanning tunneling microscope of claim 1, further comprising: an energy analyzer for analyzing energies of Auger electrons emitted from said specimen when said negative potential is increased; and a means for providing a display according to a signal from said energy analyzer.

3. A scanning tunneling microscope comprising:
   a conducting tip;
   a means for moving said tip relative to a specimen in two dimensions;
   a variable bias voltage source for applying a positive potential to said tip with respect to said specimen;
   a device for varying a distance between said tip and said specimen so that a tunneling current flowing therebetween is kept constant;
   a control means for controlling operation of said device;
   a means for supplying gas to be ionized by an electric field to vicinities of said tip, the electric field being produced between said tip and said specimen;
   a secondary electron detector for detecting secondary electrons produced by collision of said ionized gas with said specimen when said positive potential applied to said tip from said variable bias voltage source is increased; and
   a means for displaying a scanning tunneling microscope image and for displaying a scanning secondary electron image based upon an output signal from said secondary electron detector in relation to a scanning position of said tip, whereby the scanning tunneling microscope image and the scanning secondary electron image having the same field of view and magnification are displayed.

4. A scanning tunneling microscope comprising:
   a conducting tip;
   a means for moving said tip relative to a specimen in two dimensions;

a variable bias voltage source for applying a negative potential to said tip with respect to said specimen for producing a tunneling current flow within a defined field of view, between said tip and said specimen;

a device for varying a distance between said tip and said specimen so that said tunneling current flow therebetween is kept constant at approximately 1 nA;

a control means for controlling operation of said device;

a means for displaying a scanning tunneling microscope image produced by said device from within said defined field of view;

a secondary electron detector for detecting secondary electrons emitted from said specimen from within said defined field of view when absolute value of said negative potential applied to said tip from said bias voltage source is increased to approximately 0.1 to 1 uA; and a means for displaying an output signal from said secondary electron detector in relation to a scanning position of said tip, whereby displaying a scanning secondary electron image of said specimen from within said defined field of view, and wherein said scanning secondary electron image has a same magnification as said scanning tunneling microscope image.

* * * * *